United States Patent [19]

Brown, III

[11] 3,890,161

[45] June 17, 1975

[54] DIODE ARRAY

[76] Inventor: Charles M. Brown, III, 1378 Johnson St., Menlo Park, Calif. 94025

[22] Filed: July 16, 1973

[21] Appl. No.: 379,588

[52] U.S. Cl. ................ 136/212; 136/225; 136/241; 357/87

[51] Int. Cl. ................ F42b 1/04

[58] Field of Search ........... 136/205, 206, 211, 212, 136/224, 225, 227, 230, 236, 237, 241; 317/234 Q, 234 W, 235 S; 62/3; 357/10, 15, 28, 87

[56] References Cited

UNITED STATES PATENTS

| | | | |
|---|---|---|---|
| 2,677,711 | 5/1954 | Ray | 136/216 |
| 2,981,775 | 4/1961 | Bachman | 136/236 |
| 3,053,923 | 9/1962 | Stearns | 136/206 |
| 3,081,424 | 3/1963 | Dortort | 317/234 W |
| 3,405,272 | 10/1968 | Stevens et al. | 136/206 |
| 3,632,451 | 1/1972 | Abbott | 136/203 |

*Primary Examiner*—Verlin R. Pendegrass
*Attorney, Agent, or Firm*—Limbach, Limbach & Sutton

[57] ABSTRACT

A method and apparatus for rectifying thermal electrical noise, the preferred apparatus comprising a dielectric ultra-filtration screen membrane having a plurality of cylindrical pores, each pore isolating material forming an individual diode having an internal impedance in which electrical signals are generated by effect of thermal electrical noise, the diodes are connected in parallel to cumulate the effect of rectified electrical signals for concurrent production of power and refrigeration.

7 Claims, 7 Drawing Figures

DIODE ARRAY

BACKGROUND AND SUMMARY OF THE INVENTION

An aspect of heat in materials is thermal agitation electrical noise known as Johnson Noise. Thermal agitation generates a random movement of charges or currents in an infinite range of time intervals. In a circuit, the developed power of a noise source is $P = 4KT\Delta f$, where K is Bolzmann's constant, T is the absolute temperature of the circuit in which the noise appears, and $\Delta f$ is the bandwidth defined. While this formula represents the developed power of a noise source, the internal resistance of the noise source permits a maximum available power to be abstracted that is only one-fourth the developed power of $P = KT\Delta f$; Fink, D. G. Radar Engineering, pp. 130–131, (1st Ed.), McGraw-Hill.

Johnson Noise behaves like an external signal and can be sorted, that is, preferentially conducted in one direction by a diode. Since the random movement of charges or currents in a circuit is bidirectional, the maximum power available from a rectified circuit is $\frac{1}{2}KT\Delta f$ where the internal resistance is matched to an external load. Allowance in the formula is then made for imperfect rectification resulting in the form $\frac{1}{2}KT\Delta fe$ where e is the efficiency. A plurality of rectified noise sources arranged in parallel in an array generates a resultant polarized output current that is cumulative. Thus, total power available in an array of rectified noise sources can be expressed by the formula $P = \frac{1}{2}KT\Delta fNe$, where $N$ is the number of rectified noise sources in the array. Broadly stated, the present invention comprises combining a plurality of rectifiers having an internal noise source to generate a d.c. output.

This can be accomplished by combining a plurality of sensitive low capacitance diodes having a broad bandwidth response. Within this category of diodes is the multiple cold cathodes common anode vacuum tube variation. However, to generate a meaningful output power from this combination, arrays containing diodes in the millions are preferred.

The recent development of two technically unrelated products when combined, can allow the fabrication of diodes having a sufficiently short response time, hence wide bandwidth, to be arranged in sufficiently large numbers to make generation of power by this method feasible. Concurrent with the generation of power, this combination as a result of its operation absorbs heat and provides refrigeration.

These two developments comprise the ultrafiltration screen membrane and the metal-metal diode. The ultrafiltration membrane is made from a mixture of volatile and non-volatile plastics which form a tessellation of uniform small cylindrical pores. These membranes can be fabricated with 250 A pores with 50 A walls and 100 um thick. The metal-metal diode is capable of rectifying frequencies conservatively up to $10^{12}$ Hz. Construction of a diode array by electroplating diode materials in the pores of the membrane such that each pore isolates an individual diode forms a combination that is capable of producing several watts of power per square meter.

DETAILED DESCRIPTION OF THE PREFERRED EMBODIMENT

Figure 1:
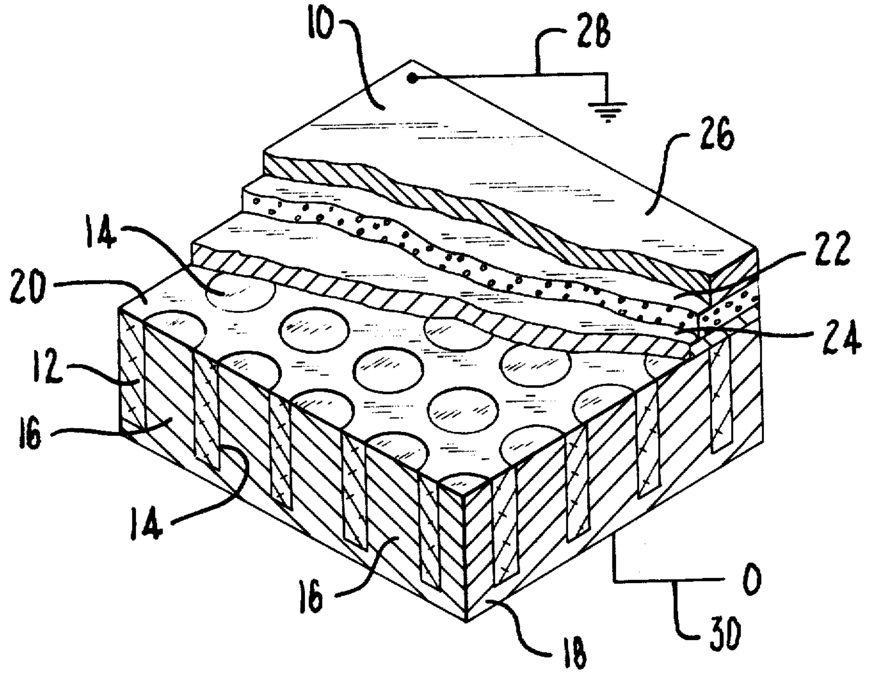
FIG. 1 is a perspective view partially in section of a segment of a preferred diode array.

Referring to FIG. 1, the laminar construction of the preferred embodiment of the diode array 10 is shown. The principle element to which the laminations are applied is the ultrafiltration membrane 12 which is formed by mixing two kinds of plastics and forming the mixture into a membrane. In one plastic the molecules are stable, and in the other the molecules are relatively volatile, but can be stabilized. Formation of pores 14 in the membrane is accomplished by allowing the molecules of the volatile plastic to evaporate until pores of the desired size are formed in the membrane at which volatization is halted. By this process, uniform cylindrical pores having a 250 A diameter can be formed. The ultrafiltration membrane is manufactured commercially by Millipore Corporation.

By electroplating in a fluid solution the pores can be filled with a nickel metal 16. On one side of the membrane 12 the nickel metal forms a uniform layer 18 across the entire surface of the membrane. The nickel metal within the pores is formed flush with the other surface of the membrane. The somewhat exaggerated configuration of this arrangement is shown in the cross-section of the membrane 12. To form a metal-metal diode the top surface 20 is laminated with a thin tungsten layer 22 having a tungsten oxide surface which interfaces each isolated nickel filled pore. The tungsten layer is formed by coating a steel plate 26 with tungsten and oxidizing the exposed surface. In this manner, the metal-metal diode is formed by the nickel and tungsten coupling separated by a tungsten oxide junction layer as shown in FIG. 1. In the same manner, other metal-metal diodes may be formed employing substitute metals such as copper-steel or copper-nickel with an oxide of one of the metals forming an interface or junction layer. Both nickel and copper can be easily electroplated and either or both employed as the membrane filler as described hereafter.

However, referring again to FIG. 1, the steel base plate 26 includes a ground 28 to convey current laterally to any tap at one side of discrete diodes. The nickel layer 18 at the opposite side of the membrane includes an output terminal 30 from which electric current is drawn.

Any heating of the diode array above absolute zero will cause thermal agitation of electrons with the junction layer. This thermal noise, or Johnson noise, is in effect an external signal and not an equilibrium product. This signal in a diode either activates attracting carriers which recombine conveying currents or activates repelling carriers which convey little current. The electrostatic sorting requires less energy than the signal itself and is as reliable as the location of fixed carriers.

The diode formed does not need energy to maintain its existence and only a little to operate. The signal generated by thermal agitation is then both the power operating the switch and the power switched. This is because the Johnson noise signal is generated at the junction itself and, therefore, requires no minimum signal to initiate this effect.

Heat is absorbed in the system because heat energizes the carriers in the first place. Some of the energy is consumed as electricity externally, and the rest is returned to the system. Since a reduced energy total will fail to maintain the original temperature, the diode array will experience a reduction in temperature and will withdraw heat from the environment. During open circuit or short circuit conditions, the device produces no power or cooling. Electron balance is maintainend in the overall system by the ground connection 28.

By isolating the junction layer within the pores of the membrane, the noise source is similarly isolated since the noise source is coincident with the junction layer. The internal field and internal state in the junction layer can then differentiate even though the diodes in the array share a common terminal voltage. This effect is not cumulative for carriers on one junction face of one diode because there is low lateral resistance, a uniform junction field, and a uniform internal state.

Figure 2:
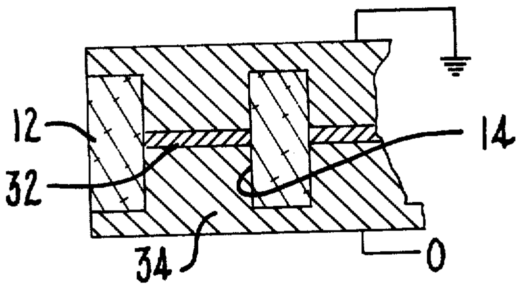
FIG. 2 is a cross sectional view of an alternate embodiment of a diode array.

With regard to the embodiment of FIG. 1, certain modifications can be made according to the materials used. For example, if a copper-nickel diode is to be formed, the junction layer can be located wholly within the pores of the membrane. For example, the fragmentary portion of membrane 12 shown in FIG. 2 includes a pore 14 having a junction layer 32 separating a copper plated layer 34 on one side of the membrane which partially fills the pore and a nickel plated layer 36 on the other side of the membrane which faces the copper layer at the junction layer 32. The junction layer comprises a thin oxidation of one of the metals before the second metal is plated to form the resultant structure shown. In the embodiment shown, the oxide layer is preferably the oxide of copper.

Figure 3:
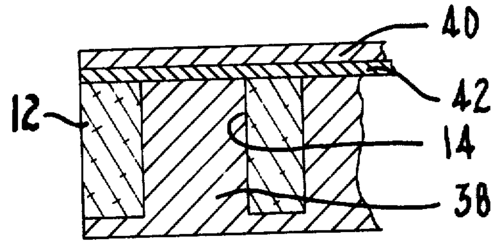
FIG. 3 is a cross sectional view of an alternate embodiment of a diode array.

In the cross section of FIG. 3, another arrangement of a metal/metal diode is shown. The fragmentary portion of membrane 12 includes a pore 14 completely filled with a nickel layer 38. A copper layer 40 includes a copper oxide surfae 42 which interfaces the nickel layer 38 of each pore forming a diode junction. This arrangement is similar to that of FIG. 1. However, in a nickel copper arrangement, the baseplate 26 which is preferred when using tungsten can be eliminated.

Figure 4:
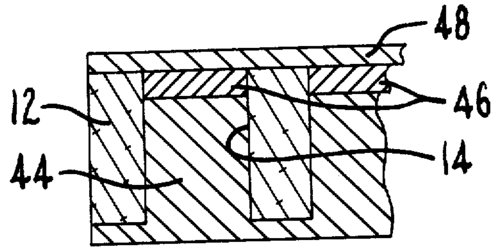
FIG. 4 is a cross sectional view of an alternate embodiment of a diode array.

In the cross section of FIG. 4 another arrangement of a metal/metal diode is shown. Again, the fragmentary membrane 12 includes a pore 14 which in this embodiment is almost completely filled with a copper layer 44. The portion of the copper layer 44 of each pore opening is oxidized to form a thin copper oxide layer 46 within each of the discrete pores 14. The copper oxide layer 46 is interfaced with a nickel layer 48 to create the diode junction.

While metal/metal diodes are preferred because of their high frequency response and ability to be electroplated, other materials may be employed, particularly in view of the new technology of dopant implantation by high energy plasma techniques in which dopant ions are implanted in materials at high ion velocities developed from a linear accelerator. This technique will undoubtably enlarge the materials suitable for diodes which may also be capable of filling membrane pores of the size contemplated.

Since the art of metal/metal/ diodes is still in its infant stage, the most appropriate materials for constructing the diode cannot be determined with certainty. It is, however, believed that the metal/metal diode because of its extremely low response time in general will provide the most practical type of diode for the system described.

Figure 5:
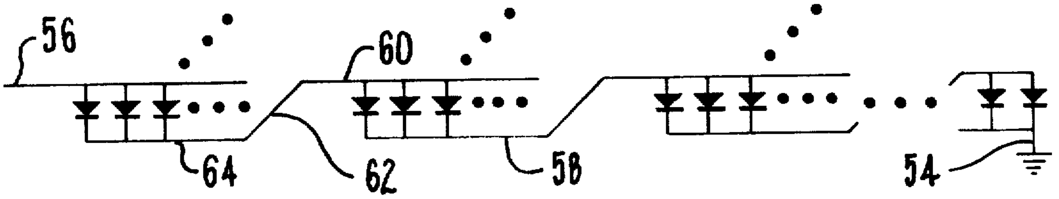
FIG. 5 is an electrical schematic of a plurality of diode arrays connected in series.
Figure 6:
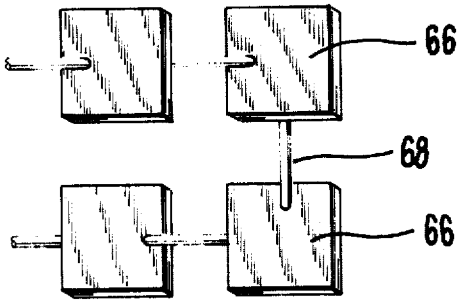
FIG. 6 is a perspective view of a plurality of separated diode arrays connected in series.
Figure 7:
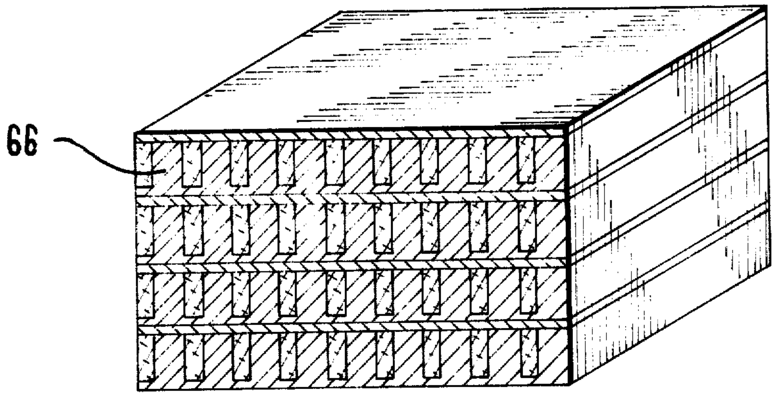
FIG. 7 is a perspective view of a plurality of laminated diode arrays connected in series.

In order to raise the voltage level of the rectified currents, a plurality of diode arrays can be connected in series as schematically shown in FIG. 5. A single ground terminal 54 and single output terminal 56 serve the combination arrangement as schematically shown. In an intermediate diode array 58, the output 60 provides the input 50 for the next adjacent array 64.

Where production of power is of primary importance, a plurality of arrays 66 as shown in FIG. 6 can be spatially displaced and electrically connected by connectors 68. Alternately, the arrays 66 can be laminated to form a combination desired thickness as shown in FIG. 7 where a plurality of diode arrays are laminated such that the output face of one array directly interfaces the input of the next adjacent array.

In operation, there is no such thing as a primary inefficiency in the array when operated either along or in series combination. When operated in equilibrium state, heat absorption and electrical output are always equal. Internal losses are fully recycled. Averaging losses, due to there being different strengths of forward signals in the diodes of the array, are probably the largest recycled loss.

A microcircuit containing 1 million diodes, each having a bandwidth of $10^{10}$ Hz, an averaging loss of 50% and exceptionally low leakage (reverse current) would yield $10^{-5}$ watts. A microdiode array formed by electroplating isolated deposits in the pores of an ultrafiltration screen member can produce arrays of $10^{10}$ to $10^{15}$ microdiodes, and perhaps is the best method of constructing diodes in sufficient numbers to consider the arrangement in the production of power. Improvements can always be made in secondary efficiency, or output per unit volume, weight or cost. A diode array using conventional point contact diodes would require such large numbers of diodes that costs would be a barring factor to their practical use. However, as broadly stated, the invented concept would include such arrangement.

I claim:

1. A diode array for rectifying thermal electrical noise comprising:

a plurality of diodes connected in parallel having a first common output terminal from which current is withdrawn connectable to a load, and a second common ground terminal connected to ground, wherein said diodes are uniformly oriented to preferentially conduct internally generated current from thermal electrical noise to said first common output terminal, wherein said plurality of diodes comprises:

a dielectric membrane with first and second surfaces having a plurality of discrete pores through the membrane isolating discrete metal/metal diodes formed by a first metal layer on said first surface of said membrane filling at least in part said discrete pores, a second metal layer on said second surface of said membrane, and a metal oxide layer interfacing said first and second metal layers.

2. The diode array of claim 1 comprising a first diode array connected in series to at least one added array, said added array having a first common output terminal from which current is withdrawn connectable to a load, and a second common input terminal connected to said first common output terminal of said first diode array, wherein said diodes of said added array are uniformly oriented to preferentially conduct internally generated current from thermal electrical noise and current from said first common output terminal of said first diode array to said first common output terminal of said added array.

3. The diode array of claim 1 wherein said first metal layer completely fills said pores, and said oxide layer is formed as an oxide of said second metal layer.

4. The diode array of claim 3 wherein said first metal layer comprises nickel, electroplated on and in said membrane, and said second metal layer comprises tungsten, and said oxide comprises tungsten oxide.

5. The diode array of claim 4 comprising further a metal baseplate interfacing said tungsten layer.

6. The diode array of claim 1 wherein said first metal layer is arranged on said first surface of said membrane substantially filling said pores, said oxide layer is formed as a surface oxide of said first metal within said pores, and said second metal is arranged on said second surface of said membrane interfacing said oxide layer in said pores.

7. The diode array of claim 1 wherein said first metal layer is arranged on said first surface of said membrane partially filling said pores, said oxide layer is formed as a surface oxide of said first metal within said pores, and said second metal layer is arranged on said second surface of said membrane partially filling said pores and interfacing said oxide layer within said pores.

* * * * *

UNITED STATES PATENT OFFICE

CERTIFICATE OF CORRECTION

Patent No. 3,890,161 Dated June 17, 1975

Inventor(s) Charles M. Brown III

It is certified that error appears in the above-identified patent and that said Letters Patent are hereby corrected as shown below:

Column 2, line 42, delete "steel plate" and insert --steel base plate--.

Column 3, line 16, "maintainend" should be --maintained--.

Signed and Sealed this

*thirtieth* Day of *December 1975*

[SEAL]

*Attest:*

RUTH C. MASON
*Attesting Officer*

C. MARSHALL DANN
*Commissioner of Patents and Trademarks*